May 27, 1941.　　　　A. C. TREECE　　　　2,243,586
CONDIMENT DEVICE
Filed July 26, 1940
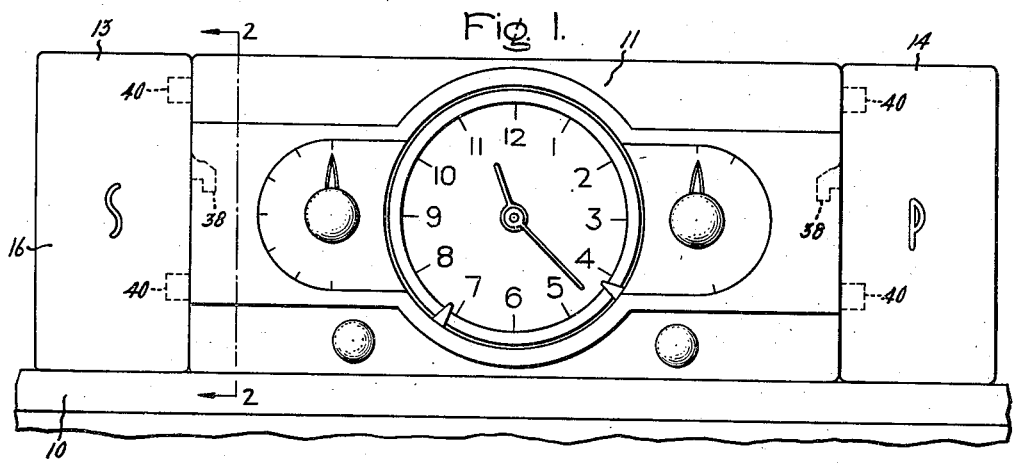
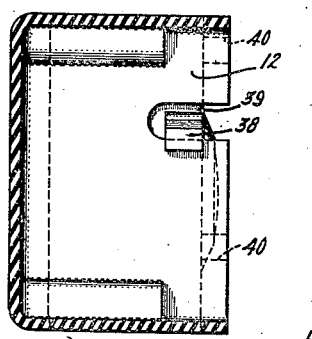
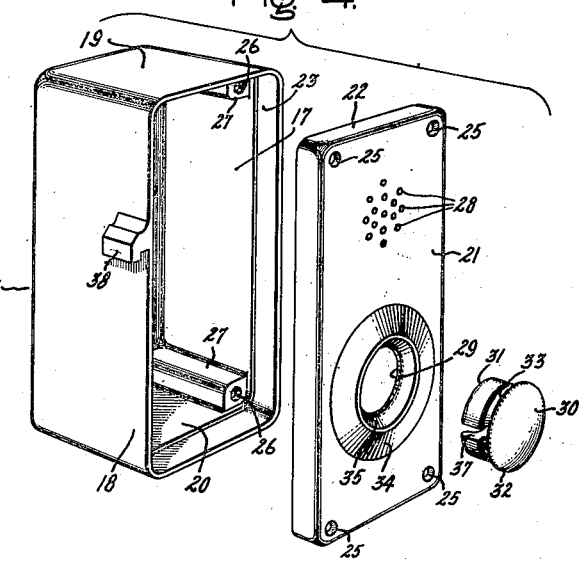
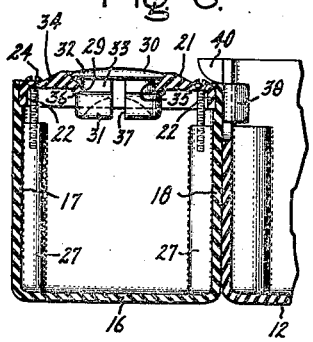
Inventor:
Arthur C. Treece,
by Harry E. Dunham
His Attorney.

Patented May 27, 1941

2,243,586

UNITED STATES PATENT OFFICE 2,243,586

CONDIMENT DEVICE

Arthur C. Treece, Chicago, Ill., assignor to General Electric Company, a corporation of New York Application July 26, 1940, Serial No. 347,795

3 Claims. (Cl. 248—224)

This invention relates to condiment devices and it has for its object the provision of an improved device of this character including a container for the condiment, and improved means for supporting the container.

While not limited thereto, this invention is particularly applicable to electric ranges, and it contemplates an improved supporting structure for a condiment container whereby the container may be attached to a suitable auxiliary device on the range, such as the time-controlled switching means for the oven of the range.

In accordance with this invention, the condiment container is provided with a hook on one of its walls which is adapted to be received in a slot provided for it in a wall of the casing that houses the switching mechanism. This wall, which constitutes a support for the condiment container, is provided with a plurality of bosses or protuberances so positioned with relation to the slot that when the condiment container is hung on the wall, the hook cannot be slid from the slot. Only by elevating the container can the hook be released from the slot, and replaced in it.

Both the condiment container and the casing wall which supports it preferably will be molded from a suitable plastic, such as a phenol condensation product. The hook preferably will be molded integrally with the condiment container, and the slot which receives it, as well as the bosses which position it, will be molded when the supporting wall is made.

For a more complete understanding of this invention, reference should be had to the accompanying drawing in which Fig. 1 is a front elevation of a condiment device embodying this invention; Fig. 2 is a sectional view taken through the line 2—2 of Fig. 1 and looking in the direction of the arrows; Fig. 3 is a horizontal sectional view taken through a portion of the condiment device of Figs. 1 and 2; and Fig. 4 is an expanded perspective view of the elements which make up the condiment container, all arranged in accordance with this invention.

Referring to the drawing, this invention has been shown in one form as applied to a condiment device intended to be used in connection with an electric range. As shown, the electric range is provided with a top surface 10 upon which is mounted a suitable control device 11 for one of the heating circuits of the range. In the particular application shown, this control device comprises a time-controlled switch for the oven of the range. The time-controlled switch comprises an elongated box-like housing 12 for the switch and timing mechanism. This housing 12 preferably will be formed of a suitable molded plastic, such as a phenol condensation product. As shown in Fig. 1, this switch mechanism is adapted to be supported by the top surface 10 of the range. It will be understood that this top surface 10 may be either the cooking top of the range, or it may be a suitable auxiliary shelf attached to the range.

Adapted to be supported on the two ends of the casing 12 are condiment containers 13 and 14, one adapted to contain salt, for example, and the other adapted to contain pepper, for example. These two containers 13 and 14 are of similar construction. Each is provided with a vertically elongated box-like casing 15 which has its rear side completely open from the top to the bottom and from side to side, as clearly shown in Figs. 3 and 4. The front wall 16, the two side walls 17 and 18, and the top and bottom walls 19 and 20 are imperforate. The open rear side of the casing is closed by a cover 21 which is adapted to be inserted into the casing.

As shown, the cover 21 is provided with a peripheral flange 22 which is arranged at right angles to the plane of the cover, and this flange 22 is adapted to be received within the casing 15 in sliding engagement with its walls. Preferably, the casing will be provided with a seat 23 for receiving the flange 22 so that when the flange is received completely within its seat 23 the outer surface of the cover 21 will be flush with the rear edges of the side and top and bottom walls of the casing, as shown in Fig. 3. Generally the friction between the flange 22 and the walls of the casing will be sufficient to hold the cover 21 in place, but if desired suitable auxiliary means, such as screws 24, may be provided to assist in holding the cover in its closed position. When these screws are used they are directed through apertures 25 provided for them in the corners of the cover and are received in tapped holes 26 provided for them in bosses 27 in the corners of the casing, as clearly shown in Figs. 3 and 4.

The cover 21, as shown, is provided with a series of discharge apertures 28 at the top through which the condiment in the container may be shaken out. The cover is further provided with a fill opening 29 at the bottom through which the container may be filled with the condiment.

This fill opening 29 is closed by a resilient stopper 30. This stopper, as shown, is provided with inner and outer flanges 31 and 32 between which is a reduced section 33. The flanges 31 and 32 bear against the inner and outer faces of the cover 21, while the reduced section 33 is received in the opening 29. Preferably, the outer surface of the cover around the opening 29 will be provided with an annular boss 34 having a conical seat 35 which receives the outer flange 32. The rear surface of the cover also preferably will be provided with an annular flange or bead 36 which bears against the inner flange 31 where it joins the reduced section 33, as clearly shown in Fig. 3. Preferably, the inner flange 31 as well as the reduced section 33 will be divided by means of a transverse slot 37 so that the two sections of the flange 31 may be moved together to facilitate the insertion of the closure plug 30 into its opening 29, and its removal therefrom. The two sections of the stopper on opposite sides of the slit are biased apart by the resiliency of the plug so as to firmly hold the plug within the opening 29 after it has been inserted.

The casing 15 including its cover 21 preferably will be formed of a suitable molded plastic, such as a phenol condensation product. The bosses 27 and the seat 23 will be formed when the casing is molded, and the bosses 34 and 36 on the cover, and the openings 25, 28 and 29 therein will be formed when the cover is molded.

Each container 13, 14 is adapted to be mounted upon the casing 12 provided for the time-controlled switching mechanism. For this purpose, each container is provided on one of its vertical walls adjacent its rear edge with a hook 38. The hook 38 of each container 13, 14 is adapted to be received in a slot 39 provided for it in the adjacent end wall of the container 12 adjacent its rear edge, as shown in Figs. 2 and 3. As here shown, the slots 39 open through the rear edges of the end walls. The hooks 38 will be molded with their walls of the casings 15, and likewise the slots 39 will be molded in their end walls of the casing 12 when the casing is formed.

To prevent the hooks from sliding out of the slots, each end wall of the casing 12 is provided with a plurality of abutments 40 spaced vertically along the rear edge wall, as shown in Figs. 1 and 2, and which are so positioned with relation to the associated slot 39 that when the hook 38 is hooked into the slot, as shown in Figs. 2 and 3, the abutments 40 will prevent the container from moving out of the open end of the slot. The abutments 40 also will be molded with their walls of the casing 12.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A condiment device comprising a container for holding the condiment, a hook on a wall of said container, a supporting wall for said container having a slot in one of its edges for receiving said hook to hang the container on said wall and also having a boss positioned so as to engage a wall of said container to prevent said hook from sliding from the slot when said hook is hung in said slot.

2. A condiment device comprising a vertically positioned supporting wall formed of a molded plastic having a slot molded therein and opening through one edge thereof, a container for a condiment defined by walls formed of a molded plastic having a hook molded thereto adjacent the edge of one wall thereof, said hook being adapted to be hooked over the lower edge of said slot to hang said container to said supporting wall, and said supporting wall having vertically spaced outwardly extending protuberances adjacent said edge and adapted to prevent said hook from sliding out of the open end of said slot.

3. A condiment device comprising a container for the condiment formed of a molded plastic and having a hook molded on one of its walls, and a supporting wall for said container formed of a molded plastic and having a slot molded therein for receiving said hook so as to support said container, and said supporting wall also having protuberances molded integrally with it and constructed and arranged to position said container with reference to said wall.

ARTHUR C. TREECE.